(12) United States Patent
Zhang et al.

(10) Patent No.: US 10,178,498 B2
(45) Date of Patent: Jan. 8, 2019

(54) METHOD AND DEVICE FOR SIGNAL PROCESSING

(71) Applicant: Alibaba Group Holding Limited, Grand Cayman (KY)

(72) Inventors: Jin Zhang, Hangzhou (CN); Wei Lin, Hangzhou (CN); Lan Luo, Hangzhou (CN); Zhi Li, Hangzhou (CN); Yun Jiang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/447,216

(22) Filed: Mar. 2, 2017

(65) Prior Publication Data

US 2017/0257738 A1    Sep. 7, 2017

(30) Foreign Application Priority Data

Mar. 7, 2016    (CN) .......................... 2016 1 0128653

(51) Int. Cl.
    *G06Q 30/02* (2012.01)
    *H04W 4/02* (2018.01)
    *H04W 4/021* (2018.01)

(52) U.S. Cl.
    CPC ........ *H04W 4/021* (2013.01); *G06Q 30/0204* (2013.01)

(58) Field of Classification Search
    CPC .......................... H04W 4/021; G06Q 30/0204
    See application file for complete search history.

(56) References Cited

U.S. PATENT DOCUMENTS

| 8,350,758 B1 | 1/2013 | Parvizi et al. |
| 8,743,782 B1 | 6/2014 | Patel |
| 8,914,235 B1 | 12/2014 | Wichrowska et al. |
| 9,110,159 B2 | 8/2015 | Vartanian et al. |

(Continued)

FOREIGN PATENT DOCUMENTS

| EP | 2503832 A2 | 9/2012 |
| EP | 2586221 A2 | 5/2013 |

OTHER PUBLICATIONS

International Search Report and Written Opinion to corresponding International Application No. PCT/US2017/020649 dated May 23, 2017 (9 pages).

(Continued)

*Primary Examiner* — Qun Shen
(74) *Attorney, Agent, or Firm* — James J. DeCarlo; Greenberg Traurig, LLP

(57) ABSTRACT

The disclosure describes a method and device for signal processing. The method includes generating a signal time series associated with a terminal device based on time points for signal collection and intensities of signals collected at the time points collected from the terminal device by signal collection devices deployed in a spatial object; obtaining at least one segment of the signal time series by segmenting the signal time series according to a pre-generated segmenting interval; and determining, for the at least one segment, if a user of the terminal device is located in the spatial object during a continuous period of time included in the at least one segment. The disclosure may be used to statistically analyze user traffic in a spatial object and reduce resource consumption.

20 Claims, 4 Drawing Sheets

(56) References Cited

U.S. PATENT DOCUMENTS

| | | |
|---|---|---|
| 9,244,152 B1 | 1/2016 | Thiagarajan |
| 9,286,776 B1 | 3/2016 | Morton |
| 9,357,346 B2 | 5/2016 | Jagannath |
| 9,491,574 B2 | 11/2016 | O'Sullivan et al. |
| 9,497,596 B2 | 11/2016 | Cho et al. |
| 9,898,881 B2* | 2/2018 | Ives-Halperin ........ G06Q 10/02 |
| 2013/0288704 A1* | 10/2013 | Wirola ................. H04W 64/00 |
| | | 455/456.1 |
| 2013/0304789 A1* | 11/2013 | Herlein ................. G06Q 30/02 |
| | | 709/201 |
| 2013/0317944 A1 | 11/2013 | Huang et al. |
| 2014/0087752 A1 | 3/2014 | Zhu et al. |
| 2014/0308973 A1* | 10/2014 | Garin ................... H04W 4/023 |
| | | 455/456.1 |
| 2015/0063135 A1 | 3/2015 | Park et al. |
| 2015/0066557 A1* | 3/2015 | Lichti ................... H04W 4/028 |
| | | 705/7.15 |
| 2015/0160673 A1* | 6/2015 | Vasylyev ........... H05B 37/0227 |
| | | 700/295 |
| 2015/0181014 A1 | 6/2015 | Gerhardt et al. |
| 2015/0334523 A1* | 11/2015 | Lappetelainen ...... H04W 4/021 |
| | | 455/456.1 |
| 2015/0350849 A1* | 12/2015 | Huang ................... H04W 4/04 |
| | | 455/456.1 |
| 2016/0044129 A1* | 2/2016 | Bergmann .......... H04L 67/2847 |
| | | 455/406 |
| 2016/0135132 A1* | 5/2016 | Donepudi ............. H04W 4/025 |
| | | 370/311 |
| 2016/0139239 A1 | 5/2016 | Thiagarajan |

OTHER PUBLICATIONS

International Preliminary Report on Patentability to corresponding International Application No. PCT/US2017/020649 dated Sep. 20, 2018 (8 pages).

* cited by examiner

METHOD AND DEVICE FOR SIGNAL PROCESSING

CROSS-REFERENCE TO RELATED APPLICATIONS

This application claims the benefit of priority of Chinese Application No. 201610128653.7, titled "Method and Apparatus for Signal Processing," filed on Mar. 7, 2016, which is hereby incorporated by reference in its entirety.

BACKGROUND

Field of the Disclosure

The disclosure relates to the field of communications, and in particular, to a methods and devices for signal processing.

Description of the Related Art

There are usually a large number of users in spatial objects (e.g., supermarkets, shopping centers, business halls, restaurants, etc.). Based on various service requirements, it is necessary to analyze user traffic to determine which users have, or have not, entered a spatial object. For example, in order to enhance competitiveness, spatial objects (or operators of spatial objects) will push information, such as special offers, sales campaigns, and new products, to users in the store, thus it is necessary to determine users in the store. In another example, in order to perform service planning of a spatial object, it is also necessary to determine user traffic in the spatial object.

Current techniques utilize a camera-based user traffic analysis approach. That is, cameras are installed in a spatial object to collect image information about users entering the store and the collected image information is transmitted to a server, which then analyzes the image information to obtain users in the spatial object. This approach necessarily requires image data to be transmitted and processed. Since the amount of image data is relatively large, this approach consumes more bandwidth resources and computing resources, and is not cost effective.

BRIEF SUMMARY

In various aspects of the disclosure, a method and device of signal processing are provided to statistically analyze user traffic in a spatial object and reduce resource consumption.

In one embodiment, a method for signal processing is disclosed. In this embodiment, the method comprises generating a signal time series associated with a terminal device based on time points for signal collection and intensities of signals collected at the time points collected from the terminal device by signal collection devices deployed in a spatial object; obtaining at least one segment of the signal time series by segmenting the signal time series according to a pre-generated segmenting interval; and determining, for the at least one segment, if a user of the terminal device is located in the spatial object during a continuous period of time included in the at least one segment.

In another embodiment, a device for signal processing is disclosed. In this embodiment, the device includes one or more processors and a non-transitory memory storing computer-executable instructions therein that, when executed by the processor, cause the apparatus to generate a signal time series associated with a terminal device based on time points for signal collection and intensities of signals collected at the time points collected from the terminal device by signal collection devices deployed in a spatial object; obtain at least one segment of the signal time series by segmenting the signal time series according to a pre-generated segmenting interval; and determine, for the at least one segment, if a user of the terminal device is located in the spatial object during a continuous period of time included in the at least one segment.

In the disclosure, signal collecting devices are deployed in a spatial object to collect signals of terminal devices. A signal processing device generates a signal time series associated with the terminal device based on time points for signal collection and intensities of signals collected from the terminal device at the time points by a signal collection device, segments the signal time series based on a pre-generated segmenting interval so as to obtain at least one signal time segment, and for each signal time segment, determines, based on the signal time segment, whether the user with the terminal device is located within the spatial object for the duration of the signal time segment, thereby allowing for statistical analysis of user traffic in the spatial object. Meanwhile, the data transmitted and processed in the disclosure represents time points for signal collection and intensities of signals collected at the time points and is far less burdensome, in terms of volume and bandwidth, than current techniques that utilize image data. Therefore, compared with current techniques, the disclosure not only supports statistical analysis of user traffic in the spatial object but also saves bandwidth resources and computing resources.

BRIEF DESCRIPTION OF THE DRAWINGS

In order to more clearly illustrate the embodiments of the disclosure, the drawings which are used in the description of the embodiments or the prior art will be briefly introduced below. It should be noted that the drawings described below are only some embodiments of the disclosure, and are not intended to unduly limit the scope of the embodiments depicted therein.

DETAILED DESCRIPTION

In order to make the purposes, technical schemes and advantages of the embodiments of the disclosure clearer, the technical schemes in the embodiments of the disclosure will be clearly and fully described below with reference to the drawings in the embodiments of the present invention. It is apparent that the described embodiments are a few of the embodiments of the disclosure, rather than all the embodiments. On the basis of the embodiments in the disclosure, all other embodiments obtained by those skilled in the art without making creative efforts shall fall within the protection scope of the disclosure.

There are usually a large number of users in various spatial objects, such as a supermarket, a shopping center, a business hall, a restaurant, etc. Based on various service requirements, it is necessary to analyze user traffic to check which users have entered a spatial object and which users have not. For example, in order to promote competitiveness, these spatial objects will push information, such as special offers, sales campaigns, and new products, to users in the store, where it is necessary to determine users in the store. For another example, in order to perform service planning in a spatial object, it is also necessary to determine user traffic in the spatial object.

In existing solutions, a camera-based traffic analysis approach is employed. This approach is problematic due to the relatively large consumption of resources.

To address the above problem, the disclosure provides a technical solution, which operates as follows: signal collecting devices are installed in a spatial object to collect radio signals sent from terminal devices carried by users and upload, to a back-end signal processing device, time points for collecting signals of terminal devices and intensities of the signals collected at the time points. A signal processing device analyzes user traffic in the spatial object based on the time points for signal collection and intensities of signals collected at the time points collected by signal collecting devices. The data transmitted and processed in the disclosure represents time points for signal collection and intensities of signals collected at the time points and is far smaller than image data, in terms of volume. Therefore, compared with existing solutions, the disclosure not only supports statistical analysis of user traffic in the spatial object but also saves bandwidth resources and computing resources.

As a preliminary matter, the present embodiment sets no limitations on the type of the spatial object. For example, it may be, but is not limited to: a physical store, a mall, an amusement park, an entertainment venue, an exhibition, a supermarket, a shopping center, a business hall, or a restaurant.

Figure 1:
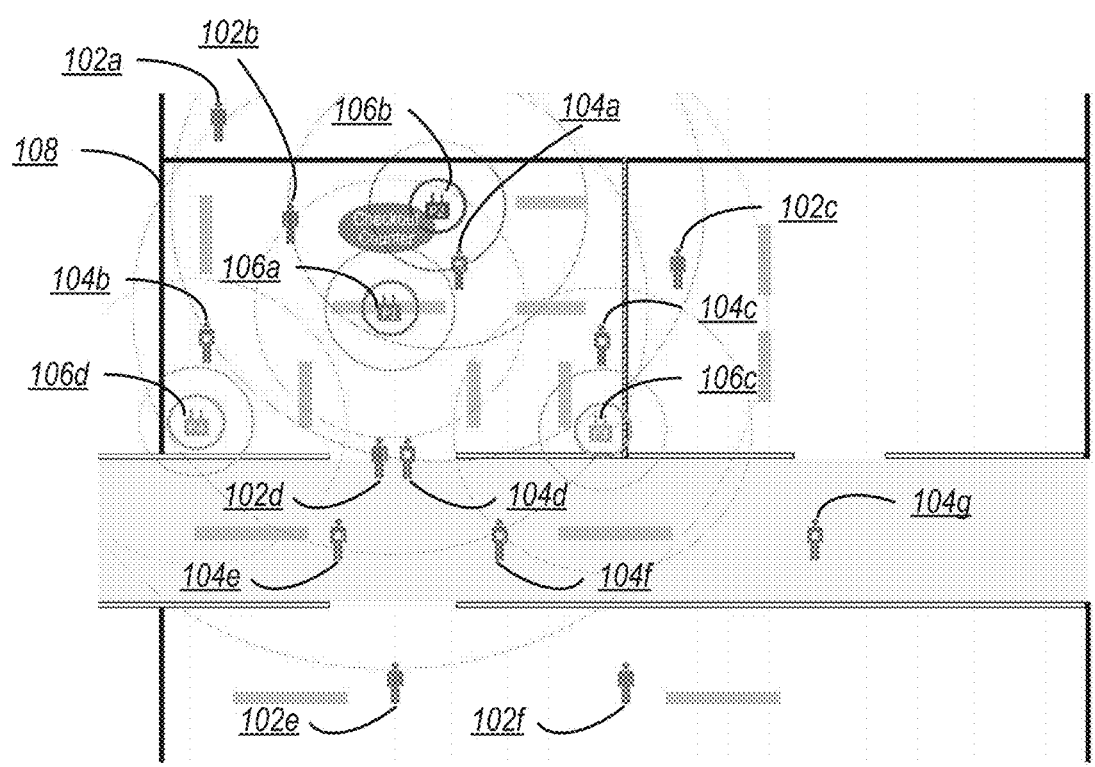
FIG. 1 is a deployment schematic of a physical store in a mall according to some embodiments of the disclosure.

The following will describe in detail the technical solution of the disclosure through specific embodiments with reference to FIG. 1, which shows the deployment of a physical store in a mall.

FIG. 1 is a deployment schematic of a physical store in a mall according to some embodiments of the disclosure.

As shown in FIG. 1, a physical store in the upper left quadrant is used as an example. In the illustrated embodiment, there are users (102*a-f* and 104*a-g*) both inside and outside the physical store 108. Among these users, some (104*a-g*) are carrying terminal devices, and others (102*a-f*) are not. For ease of distinction, user icons with blank squares (104*a-g*) represent users with terminal devices, and conversely, user icons without blank squares (102*a-f*) represent users without terminal devices. Almost all users will carry terminal devices at present and in future. A terminal device of a user periodically transmits detection signals. A terminal device has a unique media access control (MAC) address, and the user carrying the terminal device can be exclusively identified by the MAC address of the terminal device.

It is also shown in FIG. 1 that four signal collecting devices are deployed in the physical store, namely, devices 106*a*, 106*b*, 106*c*, and 106*d*. The signal collecting devices 106*a* through 106*d* may be used for collecting detection signals sent by surrounding terminal devices and reporting them to a back-end signal processing device (not illustrated).

The number and type of the signal collecting devices 106*a-d* deployed in the physical store may vary based on the size, type, and other properties of the physical store. As discussed, FIG. 1 illustrates only four signal collecting devices 106*a-d*; however, the illustrated number of signal collecting devices 106*a-d* is not intended to be limiting. Additionally, the disclosure places no limitations on the type of the signal collecting devices. For example, they may be Wi-Fi probes, Wi-Fi access points, or any other devices capable of collecting radio signals transmitted by terminal devices.

Wi-Fi access points refer to routing devices that are capable of converting wired network signals and mobile network signals into Wi-Fi radio signals to support access of terminal devices to the Internet.

Wi-Fi probes refer to special routing devices that do not provide Wi-Fi-based network browsing functions. Such devices collect, intensities of detected signals sent by surrounding terminal devices and their MAC addresses only at the broadcasting stage or data connecting stage of a Wi-Fi connection, and transmit the collected data to signal processing devices.

The Wi-Fi access points or Wi-Fi probes mentioned above are inexpensive compared to cameras, thereby reducing hardware costs. In some embodiments, the terminal device may be a user's mobile phone, tablet computer, notebook computer, or other terminal device capable of sending radio signals.

Figure 2:
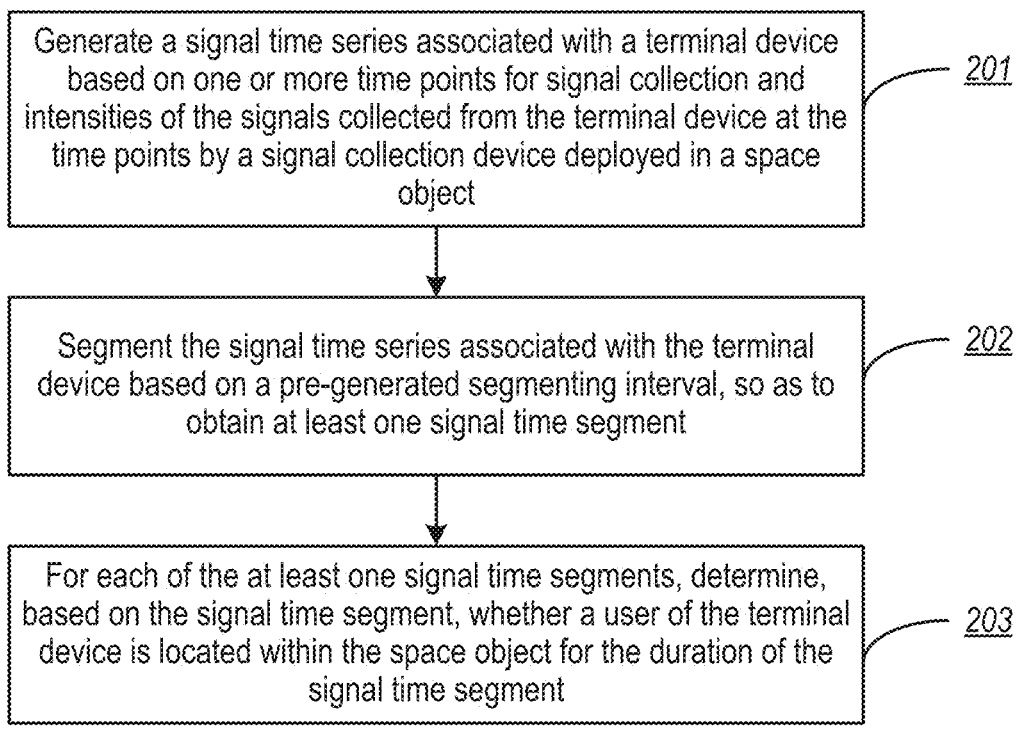
FIG. 2 is a flow diagram illustrating a method of signal processing according to some embodiments of the disclosure.

FIG. 2 is a flow diagram illustrating a method of signal processing according to some embodiments of the disclosure. The illustrated method may be understood with reference to the diagram of a physical store shown in FIG. 1.

In step 201, the method generates a signal time series associated with a terminal device based on one or more time points for signal collection and intensities of the signals collected from the terminal device at the time points by a signal collection device deployed in a spatial object.

In step 202, the method segments the signal time series associated with the terminal device based on a pre-generated segmenting interval, so as to obtain at least one signal time segment.

In step 203, for each of the at least one signal time segments, the method determines, based on the signal time segment, whether a user of the terminal device is located within the spatial object for the duration of the signal time segment.

Specifically, signal collecting devices deployed in a spatial object collect signals of terminal devices carried by users and upload data representing the signals to a back-end signal processing device. In one embodiment, data representing the signals includes time points for collecting signals of terminal devices and intensities of the signals collected at the time points.

A signal processing device receives the time points for collecting the signals of the terminal device and the intensities of the signals collected at the corresponding time points, which are sent by the signal collecting devices, and generates a signal time series associated with the terminal device (signal time series of the terminal device is also the signal time series of the user carrying the terminal device) based on the received time points and the intensities of the signals collected at the corresponding time points. The signal time series contains each time point and the intensities of signals collected at each time point, which are sent by the signal collecting devices. For example, the signal time series may be represented as:

$$\{(t_1,r_1),(t_2,r_2),(t_3,r_3)\ldots(t_n,r_n)\},$$

where $t_n$ indicates a time point, and $r_n$ indicates a vector of the intensity of a signal collected at time point $t_n$. The dimension of the vector $r_n$ depends on the number of signal collecting devices deployed in the spatial object.

In operation, if a user is within a spatial object, signal collecting devices in the spatial object will collect, at the same or similar intervals (namely, collection periods of the signal collecting devices), intensities of signals of a terminal device of the user, and the collected signal intensities exhibit the following characteristics. The closer the user is to a signal collection device, the greater the signal intensity is and vice versa. If the user leaves the spatial object, after the user is a certain distance away from the spatial object, the signal collecting devices in the spatial object will not be able to collect intensities of signals from the terminal device of the user until the user again gets close to the spatial object. Likewise, signal intensities will gradually grow higher as the user gets closer to the spatial object.

Statistical analysis of user traffic in the spatial object is primarily performed based on whether each user enters the spatial object and how long each user stays in the spatial object after each entry into the spatial object. Based on this, signals of the signal time series from the same user may be divided into at least one signal time segment, each of which indicates a possible entry of this user into the spatial object. Accordingly, the duration of a signal time segment may indicate how long a user stays in the spatial object after this entry. By performing this analysis, not only the presence of a user in the spatial object, but the time duration that a user stays in the spatial object can be statistically analyzed.

In order to segment the signal time series of the terminal device, before performing the procedure of the method provided in the present embodiment, a segmenting interval is pre-generated. The segment of time series is used to segment the signal time series into at least one signal time segment. For example, after this segmenting operation, the signal time series $\{(t_1, r_1), (t_2, r_2), (t_3, r_3) \ldots (t_n, r_n)\}$ may be segmented into the following signal time segments:

segment 1 $\{(t_1,r_1),(t_2,r_2), \ldots (t_i,r_i)\}$
segment 2 $\{(t_i+1,r_i+1),(t_i+2,r_i+2), \ldots (t_j,r_j)\}$
segment 3 $\{(t_j+1,r_j+1),(t_j+2,r_j+2), \ldots (t_k,r_k)\}$
. . .

The segmenting interval may be acquired in, but is not limited to, the following manners. In one embodiment, a similar spatial object similar to the spatial object may be identified based on the size, type, staff quantity, and other attribute information about the spatial object, and a segmenting interval used by the similar spatial object is acquired and is directly used as the segmenting interval used by this spatial object. Alternatively, a similar spatial object similar to the spatial object may be identified based on the size, type, staff quantity, and other attribute information about the spatial object, and the range of the segmenting interval used for the spatial object may be determined based on the segmenting interval used by the similar spatial object and the attribute information about the spatial object. A regression operation may be performed on the segmenting interval based on the number of users in the spatial object during a specified historical time period, to obtain the segmenting time used for the spatial object.

In an alternative embodiment, step 102 may include: from a signal time series associated with a terminal device, determining adjacent time points with an interval greater than or equal to the segmenting interval; taking a point between adjacent time points with an interval greater than or equal to the segmenting interval as a segmenting point and segmenting a signal time series associated with a terminal device, so as to obtain the at least one segment of the signal time series.

Taking segment 1 $\{(t_1, r_1), (t_2, r_2), \ldots (t_i, r_i)\}$, segment 2 $\{(t_i+1, r_i+1), (t_i+2, r_i+2), \ldots (t_j, r_j)\}$, segment 3 $\{(t_j+1, r_j+1), (t_j+2, r_j+2), \ldots (t_k, r_k)\}$ mentioned above for example, it can be known that the time interval between $t_i$ and $t_i+1$ is greater than or equal to the segmenting interval, and the time interval between $t_j$ and $t_j+1$ is greater than or equal to the segmenting interval.

For each signal time segment, the method determines whether the user of the terminal device is located within the spatial object for the duration of the signal time segment based on the signal time segment. In one embodiment, the presence of the user in the spatial object for the duration of the signal time segment can be determined, and in another embodiment, if a user is located in the spatial object for the duration of the signal time segment, the duration of the signal time segment can also be acquired, which is the time duration that a user stays in the spatial object.

As can be seen, not only the presence of a user in the spatial object, but the time duration that a user stays in the spatial object after entry can be determined for a more comprehensive statistical analysis on user traffic in the spatial object. Additionally, since the data transmitted and processed represents time points for signal collection and intensities of signals collected at the time points and is far less than image data in terms of volume, bandwidth resources and computing resources are also saved.

Further, statistical analysis of user traffic in the spatial object also includes statistical analysis of the number of users that have entered the spatial object during a given time frame and the number of users that have not (that is, those who have simply passed by the spatial object). In this embodiment, the signal processing device may, based on the result of the previously determination of whether a user has entered the spatial object, count the number of users that have entered the spatial object during a given time frame and the number of users that have not, thereby enabling a comprehensive statistical analysis on user traffic in the spatial object. For an owner of spaces, service planning or information presentment (e.g., sales campaigns) can be optimized by knowing how many users have entered the spatial object during a given time frame and how many users have not.

Furthermore, statistical analysis of user traffic in the spatial object may also include determining whether a specific user has entered the spatial object repeatedly and how many times the user has entered the spatial object during a given time period. To enable this analysis, signal collecting devices may also collect the MAC address of a terminal device while collecting the intensities of the signals of the terminal device, and they may determine, by comparing this MAC address with that of a terminal device of a user who previously entered the spatial object, whether a user has entered the spatial object repeatedly and how many times the user has entered the spatial object during a given time period. Based on the information, the attraction of the spatial object to users may be determined to facilitate service planning and sales campaigns for the spatial object.

Furthermore, statistical analysis of user traffic in the spatial object may also include determining what kind of users have entered the spatial object and what kind of users have not (that is, those who have simply passed by the spatial object). To enable this analysis, the signal processing device may pre-generate a database with big data and store in it relationships mapped between user details and MAC addresses of terminal devices. Based on this, the signal processing device may also match the MAC address of the terminal device carried by a user with those stored in the database, to acquire and output user details, thus enabling the owner of the spatial object to know information about users that have entered the spatial object and those that have not. This analysis may aid an owner of a space in conducting business planning for the spatial object and presenting information to users. For example, user details may include the image, gender, age, and other identity information, and may also include the interests, purchase habits, and shopping behaviors. Based on this information, advertisements or marketing strategies matching a user's behaviors, habits, or ages can be recommended.

In the above-described embodiments, a space may be a store, supermarket and restaurant, the user refers to a customer of the store, supermarket and restaurant, and the owner of a space is the individual or entity that actually runs or manages the store, supermarket and restaurant.

In some embodiments, step 103 may include the following embodiments.

In a first embodiment, the method in step 103 may determine whether the signal time segment satisfies a pre-generated space entry criteria. If so, the method verifies that a user is located within the spatial object for the duration of the signal time segment. If not, the method verifies that the user is not located within the spatial object for the duration of the signal time segment. The space entry criteria herein refers to a condition indicating a user has entered the spatial object.

In this first embodiment of step 103, it may be necessary to pre-generate a space entry criteria which primarily refers to a condition for determining whether a user has entered the spatial object. In an alternative embodiment, the space entry criteria includes at least one of the following: the duration is greater than a pre-generated duration threshold; the number of signals is greater than a pre-generated signal number threshold; and the number of signal intensities greater than a pre-generated signal intensity threshold is greater than a pre-generated number threshold.

Based on the above, in the first embodiment of step 103, the determination of whether the signal time segment satisfies a pre-generated space entry criteria comprises performing at least one of the following determining operations. First, determining whether the duration of the signal time segment is greater than a pre-generated duration threshold. Second, determining whether the number of signals contained in the signal time segment is greater than a pre-generated number threshold. Third, determining whether the number of signal with intensities greater than a pre-generated signal intensity threshold in the signal time segment is greater than a pre-generated number threshold. If at least one result of these determining operations is positive, the method may verify that the signal time segment satisfies the space entry criteria. If the result of at least one of these determining operations is negative, the method may verify that the signal time segment does not satisfy the space entry criteria.

In the first embodiment of step 103, it is necessary to pre-generate a space entry criteria. One embodiment of pre-generating a space entry criteria includes identifying a spatial object similar to the spatial object based on attribute information of the spatial object and generating a space entry criteria of the spatial object based on a space entry criteria of the similar spatial object.

When identifying a similar space, attribute information of the spatial object, such as the type, size, staff quantity, scope of operation, and geographic location, can be used. A similar spatial object refers to another spatial object identical or similar to the spatial object in terms of the attribute information in use. For example, a spatial object of a same type and size may be considered as a similar spatial object, or a spatial object of a same scope of operation may be considered as a similar space, or a geographically similar spatial object of a same type and size may be considered as a similar space.

The generation of a space entry criteria of the spatial object based on a space entry criteria of the similar space may comprise generating corresponding parameter thresholds in the space entry criteria of the spatial object based on various parameter thresholds in the space entry criteria of the similar spatial object, such as duration threshold, signal number threshold, signal intensity threshold, and number threshold.

Furthermore, in one embodiment, a space entry criteria of a similar spatial object can be directly acquired and used as a space entry criteria of the spatial object. This specifically refers to directly acquiring various parameter thresholds in the space entry criteria of the similar spatial object, such as duration threshold, signal number threshold, signal intensity threshold, and number threshold, and using them as the corresponding parameter thresholds in the space entry criteria of the spatial object.

Furthermore, in another embodiment, ranges of a space entry criteria of the spatial object may be generated based on the space entry criteria of the similar spatial object and the attribute information about the spatial object. A regression operation may be performed for the ranges of the space entry criteria of the spatial object based on the number of users located within the spatial object during a specified historical time period, to generate a space entry criteria of the spatial object. Specifically, the method may determine ranges of corresponding parameter thresholds in the space entry criteria of the spatial object based on various parameter thresholds in the space entry criteria of the similar space, such as duration threshold, signal number threshold, signal intensity threshold and number threshold, and the attribute information (such as size and type) about the spatial object. The method may then perform a regression operation for the ranges of corresponding parameter thresholds in the space entry criteria of the spatial object based on the number of users located within the spatial object during a specified historical time period, to generate the corresponding parameter thresholds in the space entry criteria of the spatial object. In some instances, the number of users at a specified historical time period is known. For example, it may be the number of users that have entered the spatial object during one day, and the number of users may be a specific number, e.g., 70 or 80, or a certain numerical range, e.g., 70-80. The source of this information may be, but is not limited to, the owner of the spatial object.

It's worth noting that, if the spatial object is a store, supermarket, and restaurant, the number of users herein actually refers to the number of actual customers, excluding the store manager and staff. Accordingly, a space entry criteria may simply be called a store entry criteria.

In the first embodiment of step 103, it is only necessary to compare a signal time segment with a pre-generated space entry criteria, which is comparatively easy to implement, consumes less computing resources, and is highly efficient.

In a second embodiment of step 103, the method may perform a time alignment operation for the time signal segment and locate, based on each of the time signal segments, positions of a user for the duration of the time signal segment. Since the user is moving, (for example, the user may walk into the spatial object from outside and then walk out of the spatial object) the user may be located at various positions for the duration of the signal time segment, and it is possible that not all positions are within the spatial object. Based on this fact, the method may determine whether the positions located within the spatial object account for a percentage larger than a preset percentage of the user positions (for example, 50%) for the duration of the time signal segment. If so, the method may verify that the user is located within the spatial object for the duration of the signal time segment. If not, the method may verify that the user is not located within the spatial object for the duration of the signal time segment.

The second embodiment of step 103 primarily involves statistical analysis of user traffic in the spatial object with an indoor positioning method. The positioning method employed may include, but is not limited to: n-Nearest Neighbor or Bayesian Network Probabilistic Positioning.

In the above-mentioned positioning methods, it may be necessary to use a fingerprint database, which stores relationships mapping signal intensities and positions. In this embodiment, it may be necessary to pre-generate a fingerprint database corresponding to the spatial object before user positioning. Specifically, intensities of signals from a terminal device may be collected by an engineer or a store employee with a terminal device (for example, a smart phone) equipped with a signal collecting app at positions inside and outside of the spatial object that users may walk through. Relationships may then be mapped between signal intensities and positions are stored in a fingerprint database, providing a criteria for subsequent process of positioning based on the fingerprint database.

In the second embodiment of step 103, taking into account that both distances and obstructions between signal collecting devices and terminal devices vary with deployment positions of signal collecting devices, the transmission time for signals from terminal devices to different signal collecting devices may be different. That is, there will sometimes be a delay. Therefore, before a positioning operation is performed, time alignment is performed in advance for the signal time segment, in order to improve the positioning accuracy, thereby improving the accuracy of the determination of whether a user has entered a store.

Further, when using the second embodiment of step 103, since positions where a user is located for the duration of each signal time segment are obtained, the acquired information about the positions where a user is located for the duration of the signal time segment may be analyzed in different dimensions to obtain more user traffic information.

For example, for a store, mall, cinema, and amusement park of a relatively large size, sometimes a traffic diagram (e.g., a heat map diagram and/or moving route diagram) are necessary. For example, traffic is divided based on the heat map diagram and moving route diagram, and therefore, it is necessary to determine the traffic distribution at various positions for the duration of various signal time segments (heat map diagram) and the moving route of people from a given start point to a given end point (moving route diagram).

Specifically, the number of users at each position for the duration of each the time signal segment, namely, data associated with the heat map diagram, is collected based on the positions of the user for the duration of each the time signal segment.

Specifically, the number of users on each route from a given start point to a given end point for the duration of each time signal segment is counted based on the positions of the user during the duration of each time signal segment, and a popular route from the start point to the end point is identified based on the number of users on each route. A popular route refers to a route with the maximum amount of user among various routes from the given start point to the given end point. Herein, each route includes several positions, and the user amount of each route may be obtained by adding up the user amount at each position.

As can be seen in this embodiment, a heat map diagram or moving route diagram may be acquired based on the result upon user positioning, which enables a more intuitive understanding of user traffic in the spatial object and facilitates service planning, user traffic division and information pushing.

It should be noted that in order to briefly describe each foregoing method embodiment, all the method embodiments are expressed as a combination of a series of actions, but those skilled in the art should know that the disclosure is not limited by the sequence of the described actions because certain steps can adopt other sequences or can be carried out at the same time according to the disclosure. Secondly, those skilled in the art should also know that all the embodiments described in the description belong to preferred embodiments, and the related actions and modules are not necessary for the disclosure.

In the embodiments, the description of each embodiment has its own focus, and parts in a certain embodiment which are not described in detail can refer to the related descriptions of the other embodiments.

Figure 3:
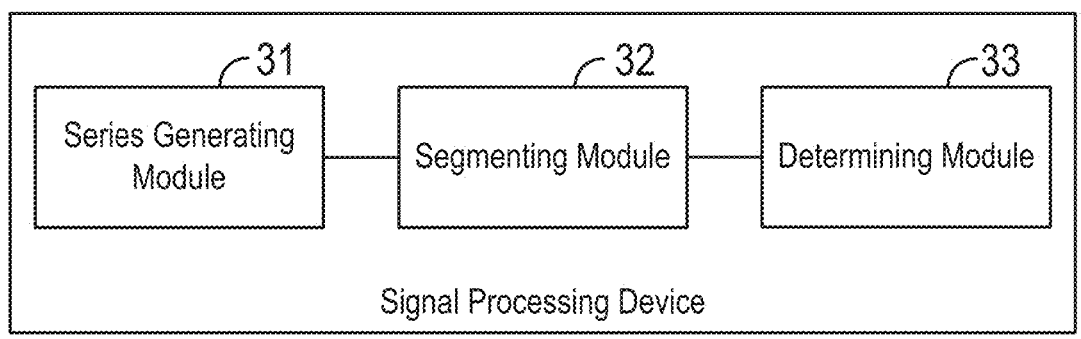
FIG. 3 is a block diagram of a signal processing device according to some embodiments of the disclosure.

FIG. 3 is a block diagram of a signal processing device according to some embodiments of the disclosure.

As shown in FIG. 3, the device includes: a series generating module 31, a segmenting module 32, and a determining module 33.

The series generating module 31 is configured to generate a signal time series associated with the terminal device based on time points for signal collection and intensities of signals collected by a signal collection device deployed in a spatial object from the terminal device at the time points.

The segmenting module 32 is configured to segment the signal time series associated with the terminal device based on a pre-generated segmenting interval, so as to obtain at least one signal time segment.

The determining module 33 is configured to determine, for each of the at least one signal time segments, whether a user of the terminal device is located within the spatial object for the duration of the signal time segment based on the signal time segment.

In an alternative embodiment, the segmenting module 32 may, from a signal time series associated with a terminal device, determine adjacent time points with an interval greater than or equal to the segmenting interval, take a point between adjacent time points with an interval greater than or equal to the segmenting interval as a segmenting point, and segment a signal time series associated with a terminal device, so as to obtain the at least one segment of the signal time series.

In an alternative embodiment, the determining module 33 may determine whether the signal time segment satisfies a pre-generated space entry criteria. If so, the determining module 33 verifies that the user is located within the spatial object for the duration of the signal time segment. If not, the determining module 33 verifies that the user is not located within the spatial object for the duration of the signal time segment.

In one embodiment, the determining module 33 may, when determining whether the signal time segment satisfies a pre-generated space entry criteria, perform at least one of the following determining operations. First, the determining module 33 may determine whether the duration of the signal time segment is greater than a pre-generated duration threshold. Second, the determining module 33 may determine whether the number of signals contained in the signal time segment is greater than a pre-generated number threshold. Third, the determining module 33 may determine whether the number of signals with intensities greater than a pre-generated signal intensity threshold in the signal time segment is greater than a pre-generated number threshold. If at least one result of these determining operations is positive, the determining module 33 may verify that the signal time segment satisfies the space entry criteria; and if the result of at least one of the determining operations is negative, the determining module 33 may verify that the signal time segment does not satisfy the space entry criteria.

Figure 4:
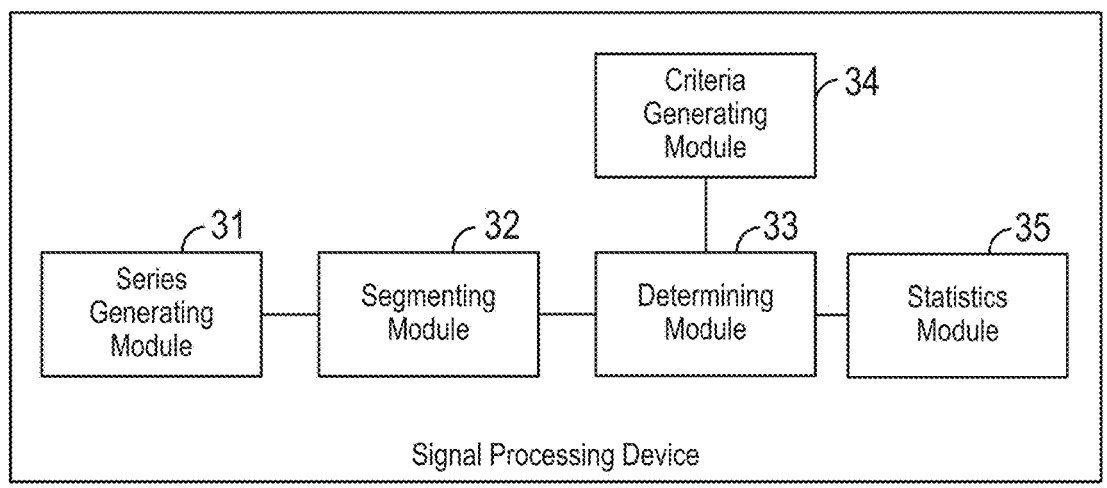
FIG. 4 is a block diagram of a signal processing device according to some embodiments of the disclosure.

FIG. 4 is a block diagram of a signal processing device according to some embodiments of the disclosure. As illustrated, the device includes a series generating module 31, a segmenting module 32, and a determining module 33. The description of modules 31, 32, and 33 provided in connection with FIG. 3 is incorporated herein by reference. In the embodiment illustrated in FIG. 4, the signal processing device further comprises a criteria generating module 34.

The criteria generating module 34 is used for identifying, before the determining module 33 determines whether the signal time segment satisfies a preset space entry criteria, a space similar to the spatial object based on attribute information associated with the spatial object. The criteria generating module 34 may then generate a space entry criteria of the spatial object based on a space entry criteria of the similar spatial object.

Further, when generating a space entry criteria of the spatial object based on a space entry criteria of the similar spatial object, the criteria generating module 34 may directly acquire a space entry criteria of the similar space and using it as a space entry criteria of the spatial object. Alternatively, the criteria generating module 34 may generate a range of space entry criteria for the spatial object based on the space entry criteria of the similar spatial object and the attribute information about the spatial object, and perform a regression operation for the range of the space entry criteria of the spatial object based on the number of users located within the spatial object during a specified historical time period, By utilizing a regression operation, the criteria generating module 34 may generate a space entry criteria of the spatial object.

In an alternative embodiment, the determining module 33 may perform a time alignment operation for the time signal segment and locate, based on the time signal segment, user positions for the duration of the time signal segment. Next, the determining module 33 may determine whether the positions located within the spatial object account for a percentage larger than a preset percentage of the user positions for the duration of the time signal segment. If so, the determining module 33 may verify that the user is located within the spatial object for the duration of the signal time segment. If not, the determining module 33 may verify that the user is not located within the spatial object for the duration of the signal time segment.

In alternative embodiments, as shown in FIG. 4, the signal processing device further comprises a statistics module 35.

The statistics module 35 may be configured to perform at least one of the following operations. First, counting the number of users at each position for the duration of each time signal segment based on the position of the user for the duration of each time signal segment. Second, counting the number of users on each route from a given start point to a given end point for the duration of each time signal segment based on the positions of the user during the duration of each time signal segment. Third, identifying a popular route from the start point to the end point based on the number of users on each route.

The signal processing device provided in the illustrated embodiments generates a signal time series associated with the terminal device based on time points for signal collection and intensities of signals collected from the terminal device at the time points by a signal collection device deployed in the spatial object, segments the signal time series based on a pre-generated segmenting interval so as to obtain at least one signal time segment, and for each signal time segment, determines, based on the signal time segment, whether the user with the terminal device is located within the spatial object for the duration of the signal time segment, thereby generating statistics and analysis of user traffic in the spatial object. Meanwhile, since the data received and processed by the signal processing device in the illustrated embodiments represents time points for signal collection of the terminal device and intensities of signals collected at the time points it utilizes significantly less volume and bandwidth than current techniques that utilize image data. Therefore, compared to current techniques, the illustrated embodiments not only support statistical analysis of user traffic in the spatial object but also save bandwidth and computing resources.

Those skilled in the art can clearly understand that for a convenient and simple description, the specific working processes of the systems, the device and the units described above can refer to the corresponding processes in the foregoing method embodiments, and are not repeated here.

In the several embodiments provided by the disclosure, it should be understood that the disclosed systems, device and methods can be implemented in other ways. For example, the device embodiment described above is merely schematic. For example, the division of the units is merely a logical function division, there can be other division methods in practical implementation, for example, a plurality of units or components can be combined or can be integrated into another system, or some features can be ignored, or are not executed. From another point, the displayed or discussed intercoupling or direct coupling or communication connection can depend on some interfaces, and the indirect coupling or communication connection of the device or the units can be electrical, mechanical or other forms.

The units described as separate parts may or may not be physically separate, and the parts shown as units may or may not be physical units, and not only can be located in one place, but can also be distributed onto a plurality of network units. Some or all of the units can be chosen to implement the purpose of the embodiment schemes according to actual requirements.

In addition, respective function units in respective embodiments of the disclosure can be integrated into one processing unit, or respective units can physically exist alone, or two or more units can be integrated into one unit. The integrated unit can be put into practice in the form of hardware or in the form of hardware coupled with a software function unit.

The integrated unit which is put into practice in the form of the software function unit can be stored in an accessible storage medium for computers. The software function unit stored in the storage medium includes a number of instructions to make a computer device (such as a personal computer, a server or a network device) or a processor to execute part of the steps of the method described by each embodiment of the disclosure. The foregoing storage medium can be various media capable of storing program codes, such as a USB flash disk, a mobile hard disk, a read-only memory (ROM), a random access memory (RAM), a disk or a compact disk.

Finally, it should be noted that the embodiments are only used to describe the technical schemes of the disclosure, rather than limit the technical schemes of the disclosure; although the disclosure is described in detail with reference to the forgoing embodiments, those skilled in the art shall understand that they still can modify the technical scheme recorded in each forgoing embodiment or equivalently replace part of the technical features; however, these modifications or replacements shall not make the essences of corresponding technical schemes depart from the spirit and scope of the technical scheme of each embodiment of the disclosure.

The invention claimed is:

1. A method comprising:
generating a signal time series associated with a terminal device based on time points for signal collection and intensities of signals collected at the time points, the signals collected from the terminal device by signal collection devices deployed in a spatial object, the intensities of signals represented by a vector having a dimensionality equal to the number of signal collection devices;
obtaining at least one segment of the signal time series by segmenting the signal time series according to a pre-generated segmenting interval;
determining, for the at least one segment, if a user of the terminal device is located in the spatial object during a continuous period of time included in the at least one segment and a duration the user is in the spatial object if the at least one segment satisfies a pre-generated space entry criteria, the determining comprising determining whether the number of signals with intensities greater than a pre-generated signal intensity threshold in the at least one segment is greater than a pre-generated number threshold included within the pre-generated space entry criteria; and
recording a location of the user within the spatial object based on determining that the user is in the spatial object, the location determined based on a fingerprint mapping between signal intensities and known positions.

2. The method of claim 1, wherein obtaining at least one segment of the signal time series comprises:
identifying, from the signal time series, adjacent time points within an interval greater than or equal to the pre-generated segmenting interval;
identifying a segmenting point between the adjacent time points; and
segmenting the signal time series based on the segmenting point to obtain the at least one segment.

3. The method of claim 1, wherein determining if a user of the terminal device is located in the spatial object comprises:
verifying that the terminal device is not located within the spatial object for the duration of the signal time segment upon determining that the at least one segment does not satisfy the pre-generated space entry criteria.

4. The method of claim 3, wherein determining that the at least one segment satisfies a pre-generated space entry criteria comprises one of:
determining whether the duration of the at least one segment is greater than a pre-generated duration threshold, or
determining whether the number of signals contained in the at least one segment is greater than a pre-generated number threshold.

5. The method of claim 4, wherein before determining whether the signal time segment satisfies a pre-generated space entry criteria, the method further comprises:
identifying a similar spatial object similar to the spatial object based on attribute information of the spatial object; and
generating the pre-generated space entry criteria based on a space entry criteria of the similar spatial object.

6. The method of claim 5, wherein generating the pre-generated space entry criteria based on a space entry criteria of the similar spatial object comprises one of:
acquiring a space entry criteria of the similar spatial object and using it as a space entry criteria of the spatial object, or
generating a range of space entry criteria for the spatial object based on the space entry criteria of the similar spatial object and the attribute information about the spatial object, and performing a regression operation for the range of the space entry criteria of the spatial object based on the number of users located within the spatial object during a specified historical time period.

7. The method of claim 1, wherein determining if a user of the terminal device is located in the spatial object during a continuous period of time included in the at least one segment comprises:
performing a time alignment operation for the at least one segment;
locating a user's position for the duration of the at least one segment;
determining whether the user's position accounts for a percentage larger than a preset percentage of user positions for the duration of the at least one segment; and
verifying that the user is located within the spatial object for the duration of the at least one segment upon determining that the user's position accounts for a percentage larger than a preset percentage of user positions for the duration of the at least one segment.

8. The method of claim 7 further comprising generating a traffic diagram for the spatial object by counting a number of users at one or more positions for the duration of one or more segments of the signal time series.

9. The method of claim 7 further comprising generating a traffic diagram for the spatial object by counting a number of users on one or more routes from a start point to an end point for the duration of one or more segments of the signal time series, and determining a popular route from the start point to the end point based on the number of users on each route.

10. The method of claim 1, further comprising acquiring and displaying details about a user associated with the terminal device based on the media access control address of the terminal device.

11. A device comprising:
one or more processors; and
a non-transitory memory storing computer-executable instructions therein that, when executed by the processor, cause the device to:
generate a signal time series associated with a terminal device based on time points for signal collection and intensities of signals collected at the time points, wherein the signals are collected from the terminal device by signal collection devices deployed in a spatial object, the intensities of signals represented by a vector having a dimensionality equal to the number of signal collection devices;

obtain at least one segment of the signal time series by segmenting the signal time series according to a pre-generated segmenting interval;

determine, for the at least one segment, if a user of the terminal device is located in the spatial object during a continuous period of time included in the at least one segment and a duration the user is in the spatial object if the at least one segment satisfies a pre-generated space entry criteria, the determining comprising determining whether the number of signals with intensities greater than a pre-generated signal intensity threshold in the at least one segment is greater than a pre-generated number threshold included within the pre-generated space entry criteria; and record a location of the user within the spatial object based on determining that the user is in the spatial object, the location determined based on a fingerprint mapping between signal intensities and known positions.

12. The device of claim 11 wherein the instructions causing the device to obtain at least one segment of the signal time series further include instructions causing the device to:

identify, from the signal time series, adjacent time points within an interval greater than or equal to the pre-generated segmenting interval;

identify a segmenting point between the adjacent time points; and segment the signal time series based on the segmenting point to obtain the at least one segment.

13. The device of claim 11 wherein the instructions causing the device to determine if a user of the terminal device is located in the spatial object further include instructions causing the device to:

verify that the terminal device is not located within the spatial object for the duration of the signal time segment upon determining that the at least one segment does not satisfy the pre-generated space entry criteria.

14. The device of claim 13 wherein instructions causing the device to determine that the at least one segment satisfies a pre-generated space entry criteria further comprises instructions causing the device to:

determine whether the duration of the at least one segment is greater than a pre-generated duration threshold, or determine whether the number of signals contained in the at least one segment is greater than a pre-generated number threshold.

15. The device of claim 14 wherein before determining whether the signal time segment satisfies a pre-generated space entry criteria, the instructions further cause the device to:

identify a similar spatial object similar to the spatial object based on attribute information of the spatial object; and generate the pre-generated space entry criteria based on a space entry criteria of the similar spatial object.

16. The device of claim 15 wherein the instructions causing the device to generate the pre-generated space entry criteria based on a space entry criteria of the similar spatial object further comprise instructions causing the device to:

acquire a space entry criteria of the similar spatial object and using it as a space entry criteria of the spatial object, or generate a range of space entry criteria for the spatial object based on the space entry criteria of the similar spatial object and the attribute information about the spatial object, and performing a regression operation for the range of the space entry criteria of the spatial object based on the number of users located within the spatial object during a specified historical time period.

17. The device of claim 11, wherein the instructions causing the device to determine if a user of the terminal device is located in the spatial object during a continuous period of time included in the at least one segment further include instructions causing the device to:

perform a time alignment operation for the at least one segment;

locate a user's position for the duration of the at least one segment;

determine whether the user's position accounts for a percentage larger than a preset percentage of user positions for the duration of the at least one segment; and verify that the user is located within the spatial object for the duration of the at least one segment upon determining that the user's position accounts for a percentage larger than a preset percentage of user positions for the duration of the at least one segment.

18. The device of claim 17 wherein the instructions further cause the device to generate a traffic diagram for the spatial object by counting a number of users at one or more positions for the duration of one or more segments of the signal time series.

19. The device of claim 17 wherein the instructions further cause the device to generate a traffic diagram for the spatial object by counting a number of users on one or more routes from a start point to an end point for the duration of one or more segments of the signal time series, and determine a popular route from the start point to the end point based on the number of users on each route.

20. The device of claim 11, wherein the instructions further cause the device to acquire and display details about a user associated with the terminal device based on the media access control address of the terminal device.

* * * * *